United States Patent [19]
Johnson

[11] 4,415,164
[45] Nov. 15, 1983

[54] METHOD AND DEVICE FOR ALIGNING AND SECURING A MECHANICAL SEAL ELEMENT AND THE LIKE ON A SHAFT

[75] Inventor: Norman E. Johnson, Barrington, R.I.

[73] Assignee: EG & G Sealol, Inc., Warwick, R.I.

[21] Appl. No.: 394,309

[22] Filed: Jul. 1, 1982

[51] Int. Cl.³ .............................................. F16J 15/34
[52] U.S. Cl. ......................................... 277/1; 277/11;
  277/81 R; 277/93 R; 277/129; 277/136
[58] Field of Search ...................... 277/1, 2, 9, 9.5, 11,
  277/81 R, 91, 93 R, 93 SD, 126, 129, 136, 189, 237

[56] References Cited

U.S. PATENT DOCUMENTS

| | | |
|---|---|---|
| 2,501,100 | 3/1950 | Shafer . |
| 2,723,868 | 11/1955 | Hartranft ...................... 277/81 R X |
| 2,925,291 | 2/1960 | Bygbjerg ........................... 277/9 X |
| 3,042,414 | 7/1962 | Tracy ................................. 277/11 |
| 4,114,900 | 9/1978 | Wiese ......................... 277/93 SD X |
| 4,124,218 | 11/1978 | Wentworth ....................... 277/9 X |

Primary Examiner—Robert S. Ward, Jr.
Attorney, Agent, or Firm—Finnegan, Henderson, Farabow, Garrett & Dunner

[57] ABSTRACT

A method of and device for aligning and securing an annular member on a shaft. The annular member is formed with a bore through which the shaft extends with clearance between the parts. A plurality of set screws are provided at one axial location of the annular member and one set screw is provided at another axial location and is axially aligned with one of the first mentioned set screws. The axially aligned set screws are tightened against the shaft to draw the opposite side of the annular member against the shaft so that the centerlines of the shaft and annular member are parallel but not necessarily concentric. The other set screws are then tightened to secure the annular member to the shaft.

9 Claims, 2 Drawing Figures

METHOD AND DEVICE FOR ALIGNING AND SECURING A MECHANICAL SEAL ELEMENT AND THE LIKE ON A SHAFT

BACKGROUND OF THE INVENTION

The present invention relates to rotatable mechanical elements and more particularly to a method and device for aligning securing and a mechanical element on a shaft.

The present invention finds particular use in mechanical face seals which include engaged rotatable and non-rotatable seal components. In these seals, it is important that the rotatable seal component which is fixed to a rotatable shaft has its sealing face disposed perpendicular to the shaft axis or centerline to insure proper sealing engagement with the non-rotatable seal component.

Mechanical face seals of the type referred to above are used to provide a seal between a rotatable shaft and an opening in a pressurized container through which the shaft extends. These seals include a stationary seal component fixed to the container and a rotatable seal component fixed to the shaft. The seal components are provided with confronting annular faces which surround the shaft and which are biased into rubbing engagement to effect the seal.

It will be appreciated that it is important that the rubbing seal face on the rotatable seal component be perpendicular to the axis of rotation of the shaft in order to effect proper sealing engagement with the non-rotatable component. This normally requires that the shaft and the rotatable seal component be machined to extremely close tolerances, and that there be a relatively long pilot length of engagement between these elements. This adds significantly to the cost of these elements and often still produces unsatisfactory results.

SUMMARY OF THE INVENTION

The present invention overcomes the problems and disadvantages of the prior art by providing a rotatable mechanical face seal component which is aligned after positioning on a shaft to insure that its rubbing seal face is perpendicular to the shaft axis or centerline. The shaft and the rotatable component are sized so that clearance exists between them thereby greatly reducing manufacturing tolerance for these parts. The alignment means of this invention is integrated with the means which secures the rotatable component to the shaft to take up clearance between the shaft and the seal component and is constructed so that when the seal component is properly secured to the shaft, the centerlines of the shaft and seal component are parallel but not necessarily concentric. This insures that the rubbing face on the rotatable seal component is perpendicular to the axis or centerline of the shaft and therefore will properly engage the rubbing face on the stationary seal component. In addition, the aligning and securing means of the present invention is relatively simple and inexpensive and yet is reliable in use.

The present invention recognizes that the centerlines of the shaft and rotatable seal component need not be concentric but only that they be parallel. In other words, the rotatable seal component can be eccentric to the shaft and will produce an effective mechanical seal so long as its rubbing face is perpendicular to the shaft centerline. Of course, the present invention is not intended to exclude concentricity between the shaft and the rotatable seal component.

Further, it will be appreciated that this present invention is not limited to mechanical face seals but can be utilized in other shaft mounted elements wherein it is important that the centerlines of the shaft and the shaft mounted element be parallel but not necessarily concentric.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the present invention is directed to an aligning and securing device for an annular member mounted on a rotatable shaft, the annular member having a central bore adapted to receive the shaft with clearance therebetween, first adjustable means at one axial location on the annular member adapted to engage the shaft and secure the annular member thereto, and second adjustable means on the annular member spaced axially from the first adjustable means and adapted to engage the shaft, the first and second adjustable means operable to take up clearance between the annular member and the shaft and to render the centerlines parallel or concentric.

Broadly, the first and second adjustable means include axially aligned set screws on the annular member which engage the shaft and draw the opposite side of the annular member tightly against the shaft. Other set screws are provided on the annular member at the first axial location and are tightened against the shaft after alignment to secure the annular member to the shaft.

In another aspect, the present invention relates to a method of securing an annular member to a shaft and aligning their centerlines comprising the steps of positioning the annular member on the shaft with clearance therebetween, causing a first adjustable means at a first axial location on the annular member to engage the shaft, and causing a second adjustable means at a second axial location on the annular member and axially aligned with the first adjustable means to engage the shaft, said first and second adjustable means operable to take up clearance between the annular member and the shaft and to render their centerlines parallel or concentric, and thereafter securing said annular member to said shaft.

In still another aspect, the present invention finds particular use in a mechanical face seal of the type which includes a housing having an opening, a rotatable shaft extending into the opening, non-rotatable and rotatable annular seal members carried by the housing and shaft, respectively, the seal members being in rubbing engagement along confronting radial faces thereof; and is directed to the improvement which comprises means for aligning the rotatable annular member on the shaft and securing it thereto, the aligning and securing means including first and second adjustable means on the rotatable annular member and adapted to be moved into engagement with the shaft at aligned, axially spaced locations, the first and second adjustable means operable to take up clearance between the rotatable annular member and the shaft and to render their centerlines parallel or concentric so that the rubbing face on the rotatable annular member is perpendicular to the centerline of said shaft, and means associated with one of adjustable means for securing the rotatable annular member to the shaft.

The accompanying drawings, which are incorporated in and constitute a part of this specification, illustrate one embodiment of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
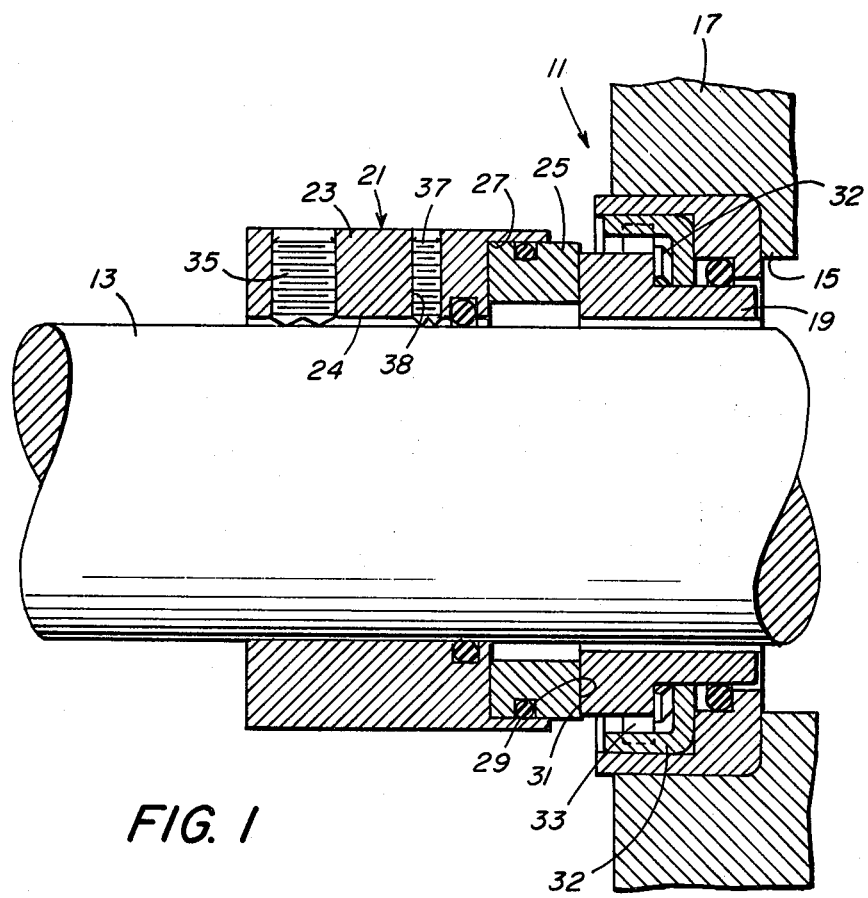
FIG. 1 is a sectional view illustrating a preferred form of the invention shown incorporated in a mechanical face seal formed between a pressurized container and a rotatable shaft extending through an opening in the container.

The preferred embodiment of the present invention is illustrated as incorporated in a mechanical face seal generally illustrated at 11 in FIG. 1 which provides a pressure seal between a rotatable shaft 13 and an opening 15 formed in a container 17. The container 17, only a portion of which is shown, can be a housing for a pump, compressor, gear box, or the like.

The seal 11 includes a stationary or non-rotatable seal component formed by a ring 19 non-rotatably mounted on the container 17 at the opening 15, and a rotatable component formed by a rotating annular member 21 fixed to the shaft 11. The rotatable annular member 21 includes an annular adapter 23 formed with a central bore 24 adapted to receive the shaft 13. An insert 25 is pressed into a counterbore 27 in the adapter 23. The insert 25 and the seal ring 19 are formed with confronting radial faces 29, 31, respectively, which are biased into rubbing engagement to effect a primary seal between the shaft 13 and the opening 15 in the container 17. For example, a spring 32 can be provided to bias the seal ring 19 axially toward the ring insert 25. Rotation of the ring 19 is prevented by engagement between a lug member 32 fixed to the housing 17 and projections 33 on ring 19.

It will be appreciated that it is of the utmost importance that the rubbing face 29 of the insert 25 be perpendicular to the centerline or axis of rotation of the shaft 11 in order to effect proper sealing engagement with the seal ring 19. This has required that the adapter bore 24 and the shaft 11 be machined to very close tolerances with very little clearance between these parts, and that there be a long pilot length for the adapter 23 on the shaft 11. This, of course, adds significantly to the cost of the seal assembly 11 and does not always produce satisfactory results insofar as properly positioning the seal face 29 perpendicular to the shaft centerline.

In accordance with the present invention, the central bore 24 of the adapter 23 receives the shaft 11 with clearance therebetween. First adjustable means at one axial location of the adapter 23 is adapted to engage the shaft 11 and to secure the adapter thereto, and second adjustable means on the adapter 23 spaced axially from the first adjustable means is adapted to engage the shaft, the first and second adjustable means being operable to take up clearance between the adapter 23 and the shaft 11 and to render their centerlines parallel or concentric.

As embodied herein, the bore 24 in the adapter 23 is sized larger than the shaft 11 so that when the adapter is positioned on the shaft, there is clearance therebetween. Although the amount of the clearance will vary, especially according to the size of the parts, clearance of about 0.007 or 0.008" has been found to be adequate. This allows for larger manufacturing tolerances for the bore 24 and the shaft 11 which greatly reduces the cost of these parts.

As further embodied herein, a first set screw 35 is provided at the end of the adapter 23 remote from the insert 25. The set screw 35 is threaded radially inwardly of the adapter 23 in an opening 34 and is adapted to engage the shaft 11. In addition, two other set screws 36,36 are provided on the adapter 23 at the same axial location as the set screw 35. The set screws 36,36 are on opposite sides of the set screw 35 spanning a quadrant of about 90° as shown. When all the set screws 35,36,36 are tightened against the shaft 11, the adapter 23 is tightly secured thereto.

Figure 2:
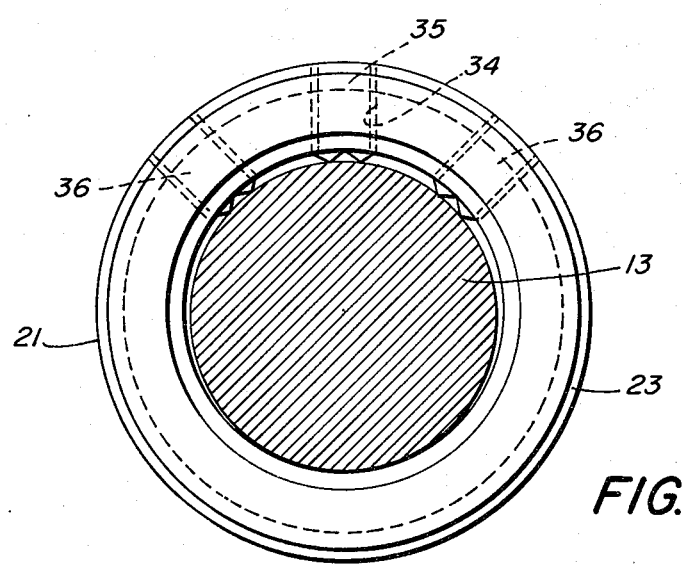
FIG. 2 is an end view of FIG. 1.

A second set screw 37 spaced axially from the first set screw 35 is threaded radially of the adapter 23 in a threaded opening 38 also for engagement with the shaft 11. The set screws 35, 37 are axially aligned so that when they are tightened against the shaft 11, they draw the adapter 23 tightly against the opposite side of the shaft 11 (see FIG. 2). This takes up clearance between the adapter 23 and causes the centerlines of the adapter 23 and the shaft 11 and to be parallel or concentric. Since the bore 24 and counterbore 27 are concentrically machined, this renders the rubbing face 29 of the insert 25 perpendicular to the centerline of the shaft.

The adapter 23 is secured to the shaft 11 and is aligned therewith in accordance with the method of the present invention as embodied herein as follows. The set screws 35, 37 are tightened against the shaft 11 to take up clearance between the shaft 11 and the bore 24 of the adapter 23 and to align the adapter and shaft so that their centerlines are parallel or concentric. Thereafter, the set screws 36, 36 are tightened against the shaft 11 and, together with the set screw 35, secure the adapter 23 to the shaft 11 in this aligned condition. Since the adapter bore 24 and counterbore 27 are machined concentric, this renders the insert rubbing face 29 perpendicular to the shaft centerline.

It will be appreciated that when the adapter 23 is aligned and secured to the shaft, as described above, their centerlines will likely be parallel and not concentric. However, in a mechanical face seal of the type disclosed herein, the seal faces 29, 31 are in rubbing engagement during rotation of the shaft 11. Therefore, it is not necessary that the centerlines of the shaft 11 and adapter 23 be concentric but only that they be parallel since eccentricity between the adapter 23 and the shaft 11 is acceptable.

It will further be appreciated that the present invention is not limited to use in mechanical face seals but will find use in any shaft mounted, annular component where it is important that the centerlines of the shaft and shaft mounted component be parallel but not necessarily concentric. For example, this invention can be utilized in certain shaft mounted bearings.

It will be apparent to those skilled in the art that various additions, substitutions, modifications and omissions can be made to the device and method of the present invention without departing from the scope or spirit of the invention. Therefore, it is intended that the present invention cover those additions, substitutions, modifications and omissions provided they come within the scope of the appended claims and their equivalents.

What is claimed is:

1. An aligning and securing device for an annular member mounted on a rotatable shaft, said annular member having a central bore adapted to receive said shaft with clearance therebetween, first adjustable means at one axial location on said annular member adapted to engage said shaft and secure said annular member thereto, and second adjustable means on said annular member spaced axially from said first adjustable means and adapted to engage said shaft, said first and second adjustable means operable to take up clearance between said annular member and said shaft and to render their centerlines parallel or concentric.

2. A device as claimed in claim 1, said first adjustable means including at least one set screw threaded radially of said annular member and engageable with said shaft, said second adjustable means including a set screw aligned axially with said at least one set screw and threaded radially of said annular member and engageable with said shaft.

3. A device as claimed in claim 2, said first adjustable means including at least two other set screws, one on either side of said at least one set screw.

4. A method of fixing an annular member to a shaft and aligning their centerlines comprising the steps of positioning said annular member on said shaft with clearance therebetween, causing a first adjustable means at a first axial location on said annular member to engage said shaft, and causing a second adjustable means at a second axial location on said annular member and axially aligned with said first adjustable means to engage said shaft, said first and second adjustable means operable to take up clearance between said annular member and said shaft and to render their centerlines parallel or concentric, and thereafter securing said annular member to said shaft.

5. A method as claimed in claim 4, said first and second adjustable means including set screws which are threaded radially of said annular member into engagement with said shaft.

6. A method as claimed in claim 5, wherein said annular member is secured to said shaft by said first adjustable set screw and at least two other set screws one at either side of said first set screw at said first axial location.

7. In a mechanical face seal of the type which includes a housing having an opening, a rotatable shaft extending into said opening, non-rotatable and rotatable annular seal members fixed to said housing and said shaft, respectively, said seal members being in rubbing engagement along confronting radial faces thereof; the improvement which comprises means for aligning said rotatable annular member on said shaft and securing it thereto, said aligning and receiving means including first and second adjustable means on said rotatable annular member and adapted to be moved into engagement with said shaft at aligned, axially spaced locations, said first and second adjustable means operable to take up clearance between said rotatable annular member and said shaft and to render their centerlines parallel or concentric so that the rubbing face on said rotatable annular member is perpendicular to the centerline of said shaft, and means associated with one of said adjutable means for securing said rotatable annular member to said shaft.

8. The improvement as claimed in claim 7, said first and second adjustable means including a first and second set screw threaded radially of said rotatable annular member and engageable with said shaft.

9. The improvement as claimed in claim 8, said securing means including at least two set screws at one of said axially spaced locations and disposed on opposite sides of the first mentioned set screw at that location.

* * * * *